April 25, 1961  E. LINSINGER  2,981,159
THREAD PEELING MACHINE
Filed Sept. 18, 1957  4 Sheets-Sheet 1

$D_F < d$ $D_F > d$

Inventor
Ernst Linsinger
By Roberts, Cushman & Grover,
Attys.

April 25, 1961     E. LINSINGER     2,981,159
THREAD PEELING MACHINE
Filed Sept. 18, 1957     4 Sheets-Sheet 2
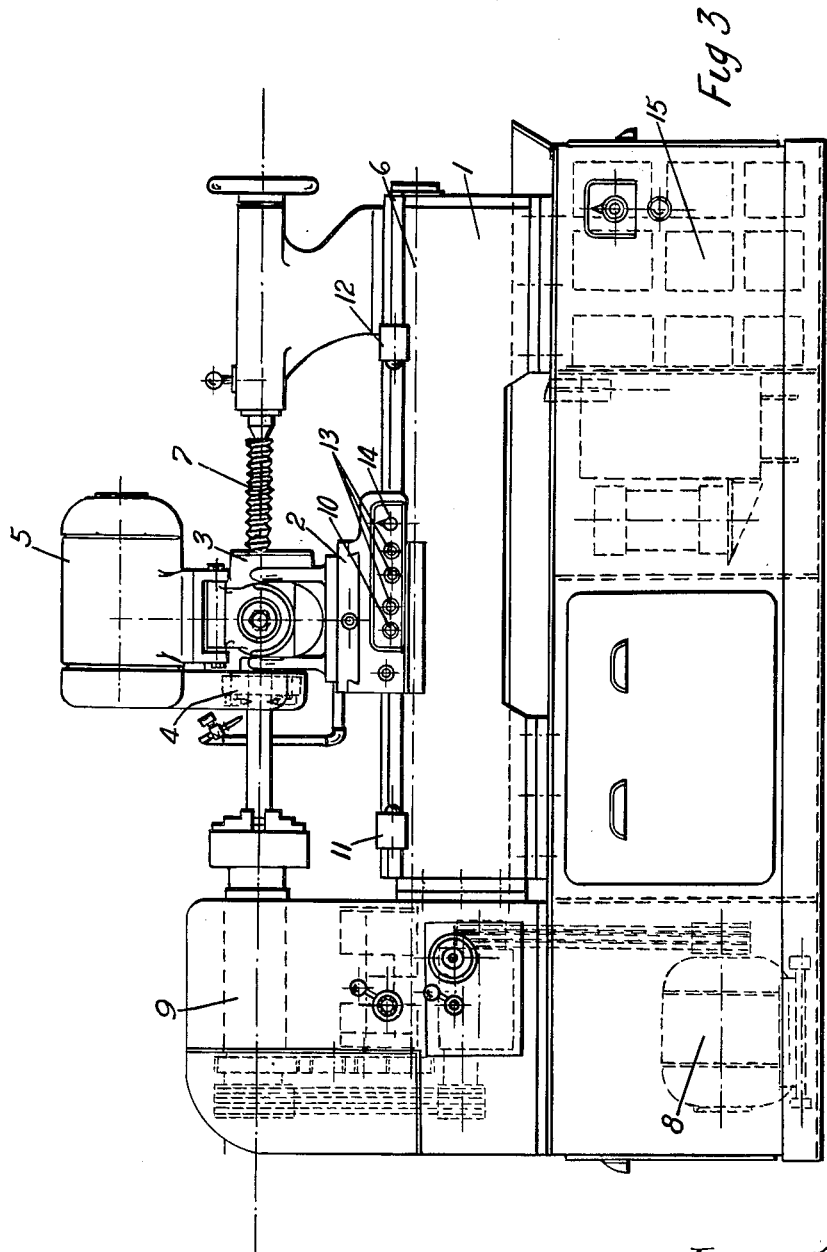
Inventor
Ernst Linsinger
By Roberts, Cushman & Grover,
Att'ys.

April 25, 1961  E. LINSINGER  2,981,159
THREAD PEELING MACHINE
Filed Sept. 18, 1957  4 Sheets-Sheet 3

April 25, 1961 E. LINSINGER 2,981,159
THREAD PEELING MACHINE
Filed Sept. 18, 1957 4 Sheets-Sheet 4

INVENTOR.
Ernst Linsinger
BY
Roberts Cushman & Grover,
ATTORNEYS

United States Patent Office 2,981,159
Patented Apr. 25, 1961

2,981,159

THREAD PEELING MACHINE

Ernst Linsinger, Steyrermuhl, Austria

Filed Sept. 18, 1957, Ser. No. 685,060

3 Claims. (Cl. 90—11.42)

The invention relates to a thread peeling machine for outside threads having a cutting head which eccentrically surrounds the work-piece, the diameter of the effective circle of the head being smaller than the outside diameter of the thread.

The technique of cutting threads into a slowly rotating work-piece by means of a quickly rotating cutter head eccentrically surrounding the work-piece is known as "fly cutting."

The effective cutting circle of the edge tips, herein also referred to as "flying circle," must always be greater than the outside diameter of the thread in order to enable the cutter head to be carried back into initial position after the cutting. The cutter head is at least approximately centered prior to the cutting; it is first advanced transversely to the axis of the work-piece until the effective flying circle of the edge tips touches the core cylinder of the thread; in this position the cutter head rotates eccentrically with regard to the axis of the work-piece. After the cut is finished the cutter head is disengaged by retracting it transversely to the axis of the work-piece. In this position it can be returned into the initial position over the previously cut thread. Users of this technique recommend the selection of a flying circle diameter about 10% greater than the outside diameter of the thread.

It has been proposed to make the diameter of the flying circle not greater or only somewhat greater than the outside diameter of the thread, but this suggestion is in its practical applicability defeated by the necessity of providing a sufficiently great safety distance between the edge tips and the outside cylinder of the thread, when the cutter head is retracted. Therefore the diameter of the flying circle must be greater than the outside diameter of the thread by an amount determined by practical requirements.

All previously known thread fly-cutting machines require that the approaching movement of the cutter head is transversely to the work-piece axis.

The present invention introduces basically new concepts. It makes use of the recognition that cutting efficiencies of a considerably higher order of magnitude can be accomplished if the flying circle of the cutter heads is smaller than the outside diameter of the thread. Thus, the election of a flying circle diameter which is smaller than the outside diameter of the thread represents the crucial core of the present inventive thought, which has heretofore not been suggested.

The following description of the general principles and of a specific embodiment refers to drawings in which:

Fig. 3 is the front elevation of a cutting machine incorporating the invention.

Figure 2:
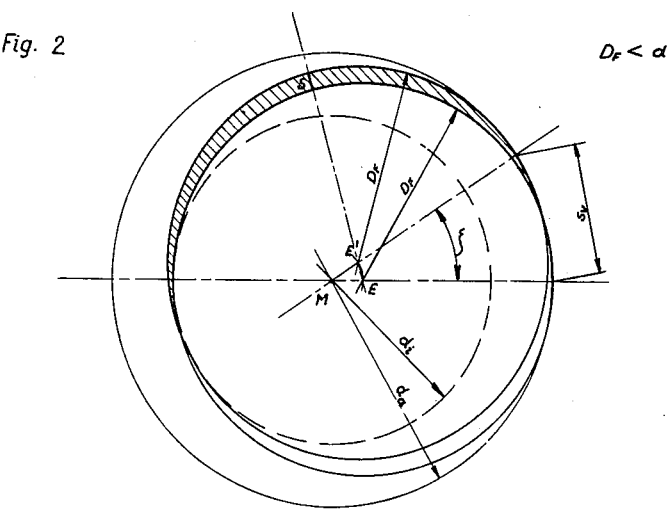
Fig. 2 is a diagram similar to Fig. 1 illustrating the departure in principle from the prior art, of the present invention.
Figure 1:
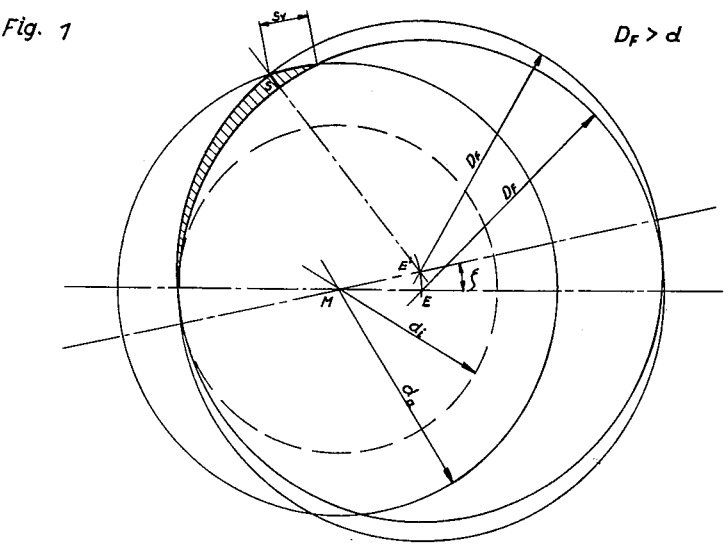
Fig. 1 is a diagram of the engagement conditions of known fly cutting machines.

The following considerations, referring to Figs. 1 and 2, are at the basis of the novel concept.

If the work-piece is deformed by a cutter head which rotates around it eccentrically, and if the flying circle diameter $D_F$ is greater than the outside diameter of the thread, as indicated in Fig. 1, then it is impossible to cut to full depth during one single cut, because the cut is subdivided into many small thin comma shaped chips. The peripheral advance $s_v$ is greater than the chip thickness $s$; its ratio is determined by the comma factor $k = s_v/s$. It can be computed with sufficient accuracy for all flying circle diameters $D_F = 1.1 \times d_a$, in accordance with the heretofore unknown formula $$k = 1/(\varphi - \tau)$$

wherein $\varphi = D_F/d_a$, the so-called clearance factor, and wherein $\tau = d_i/d_a$ is the so-called depth factor. If $$D_F = 1.1 \times d_a$$

then the comma factor is $k = 3.3$ to 6.7, for the most frequently occurring thread diameters ($\tau = 0.8$ to 0.95). The new formula indicates that the comma factor for a given thread depth becomes the larger the smaller the clearance factor is selected and confirms mathematically the known fact that the cutting effect becomes the greater the more the flying circle diameter hugs the outside diameter of the thread. Nothing has heretofore been known with regard to the effects of a further decrease of the flying circle diameter.

The investigation of the intracircular range ($D_F < d_a$) indicates that the tip configuration passes from the short stocky comma shape into a stretched sickle shape and that the formula for $k$ is also valid for $D_F < d_a$, the condition indicated in Fig. 2.

It has been recognized that the lower limit lies at $D_F = (d_a + d_i)/2 = d_m$; a further decrease would change the discontinuous cut into a continuous cut and it would become impossible to resolve the back surface, which is circular in transverse section, into separate chips. Therefore $D_F = d_m$, at least. For this limiting value the comma factor, which has now to be called sickle factor $k_s$, can be computed according to the formula $$k_s = 2/(1 - \tau)$$

For the above mentioned thread ($\tau = 0.8$ to 0.95) the numerical value for $k_s = 10$ to 40. That means that the circumferential advance $s_v$ can be selected to be 3 to 6 times as great with the same chip thickness $s$.

According to this new technique, cutter heads of known design with fixed cutters cannot be used. In accordance with the invention, cutter heads are used whose cutting means (one or more cutters) can be adjusted to assume greater flying circle diameters. The cutters must be advanced towards each other (closed in) prior to the beginning of the cut until the desired diameter is reached, and after the cut is finished they must be distanced from each other (opened). The simplest way of doing this is manually. In order to accomplish the shortest possible cutting times it is practical in accordance with the invention to perform the opening and closing automatically. This can for example be done by rotating the cutter head always only for one cut, and to use the coming on and the running off for controlling the preferably radial cutter movement.

Cutter heads whose cutters are automatically controlled on approaching and coming off are by themselves known. However they are not subject matter of the present invention. They have the characteristic property that their cutters are actuated by forces which occur within the cutter head upon approach and running off. Preferably, centrifugal or mass forces (accelerating or decelerating forces) are made use of. The forces are applied to the cutters directly by mechanical means or indirectly with the aid of a gaseous, liquid or plastic medium.

The introduction of an adjustable cutter head makes it possible to eliminate the transverse movement of the cutter head during one play, which is unavoidable in accordance with known techniques. In accordance with the present invention the cutter head remains in the once fixed position which corresponds to the thread depth, and it is moved back and forth only in the axial sense.

A thread cutting machine which is equipped with a cutter head of this type can be built as an extraordinarily efficient automatic machine. Such an automatic machine consists according to the invention of a cutter support with automatically opening and closing cutter head, driven by an individual motor; the support can be shifted in the direction of the work-piece axis by means of a leading device. The work-piece is likewise rotated by means of a motor, running at a speed which is proportionate to the computed advance. The movement of the leading device is likewise derived from the work-piece spindle. Both motors are connected, simultaneously or in timed relation, by means of a single push button. The cutter head starts, the work-piece begins to rotate, and the cutter support begins to advance towards the work-piece. After the desired thread length is obtained, an end switch disconnects the cutter motor, and the jaws open; immediately thereafter the advancing motor is reversed and the cutter support runs, preferably with increased speed, back into the initial position where it is arrested by a second end switch. After insertion of the next work-piece a further cycle is initiated by actuating a single push button.

Fig. 1 shows the engagement conditions of known fly cutting machines. It will be noted that, as mentioned above, $D_F$ is always greater than $d_a$.

M is the center of the normal cut through the work-piece with the outside diameter $d_a$ and the core diameter $d_i$. E is the center of the flying circle with $D_F$ as diameter. In this extra circular region the cutter cuts small comma shaped chips of small area.

Fig. 2 on the other hand illustrates the engagement conditions in the intracircular region. The flying circle diameter $D_F$ is in counterdistinction to known fly cutting machines smaller than $d_a$; however it must not become smaller than the above-mentioned dimension $d_m$.

It will now be evident that the following condition must be fulfilled, $$d_m \leq D_F < d_a$$

Fig. 2 indicates the limiting value $D_F = d_m = (d_a + d_i)/2$. As clearly shown, the flying circle in the working position does now not reach beyond the outside diameter of the thread. If the work-piece rotates to the next engagement through the distance $s_v$, referred to the diameter, then E travels relatively speaking to E'. The cutter has removed a chip of the thickness $s$ having the shape which is indicated by cross hatching. The chip is elongate (sickle shaped) and has a large area; the peripheral advance is great as compared to the chip thickness $s$. The ratio $s_v/s$ is considerably greater than in the extra circular region. Referred to the same chip thickness the advancing angle is also a measure for the cutting effectiveness. This angle is within the intercircular region by a multiple greater than in the extra circular region.

Figure 4:
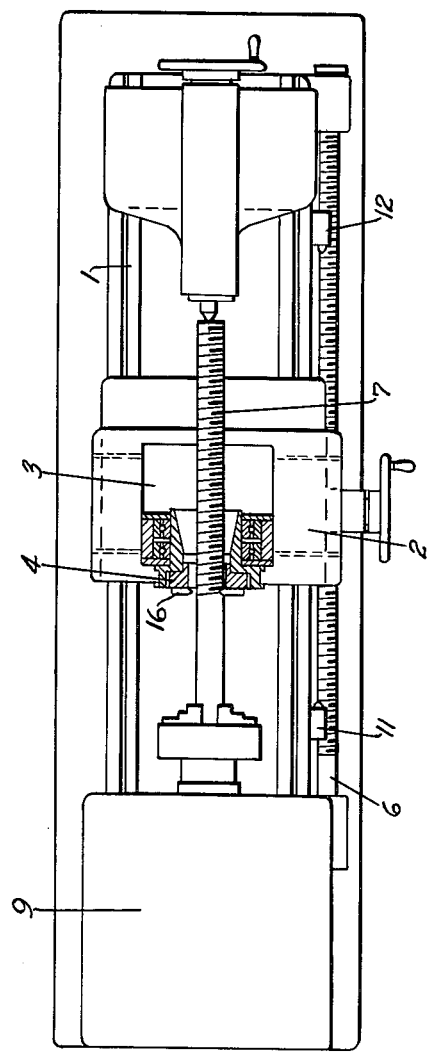
Fig. 4 is a top view, with the cutter head in horizontal section, of the machine according to Fig. 3.

Figs. 3 and 4 show the complete thread cutting machine. On a base 1 a support 2 is guided, carrying the cutting means 3, which can be of conventional design such as described in my application Serial No. 460,145, now abandoned. Fig. 4 shows the eccentricity of the head 4 relatively to the work-piece 7, and the thread cutters 16 mounted thereon. The hollow spindle carries the cutter head 4 and driven by the motor 5. The axis of the concealed leading spindle is indicated at 6. The work-piece 7 is driven by its individual motor 8 from the work-piece spindle 9. The device is started by means of the push button 10. After completed cutting cycle the left-hand end switch 11 reverses the advancing movement, the support runs back and is arrested by the right-hand end switch 12. The automatic cycle can be interrupted by means of the toggle switch 14 whereupon the motors can be individually actuated by means of the push buttons 13. The relays which are necessary for the control are mounted on a panel 15 mounted in the base of the machine.

Figure 5:
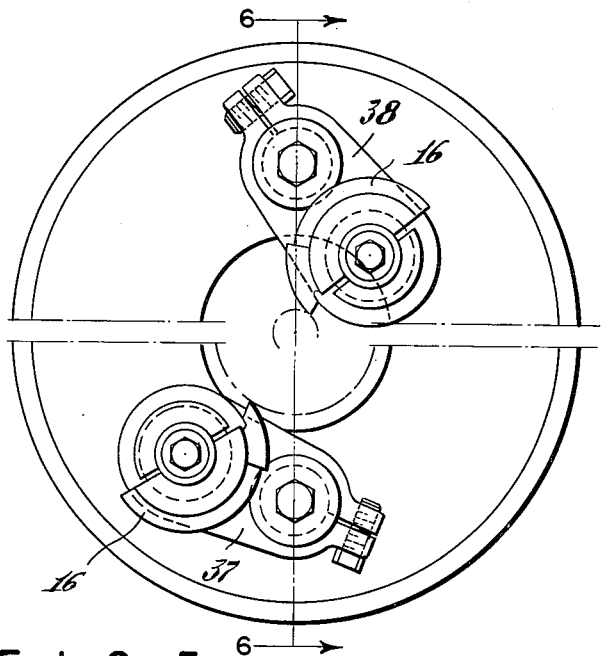
Fig. 5 is an elevation of the cutter head shown in Figs. 3 and 4.

It will be evident that the above described apparatus is known so far as its general construction is concerned. A specific embodiment showing how the cutter head 4 is opened and closed, after a threading cut, will now be described with reference to Figs. 5 to 7.

A housing 21 for the cutter head 4 on the cutting means 3 (Figs. 3, 4, 6) which is suitably connected to the leading spindle 6 of the machine, has pivoted thereto upon shafts 22, 23 two single armed centrifugal force levers 24, 25. These levers are urged by springs 28, 29 towards an inner normal position wherein they contact the body 21 on adjustable stops 31, 32. Weight and distance of the center of gravity of the levers are adjusted by means of the springs 28, 29 such that the levers 24, 25 are urged outwardly at a predetermined speed. The travel of the levers can be predetermined by means of the adjustable stops 35, 36.

Figure 6:
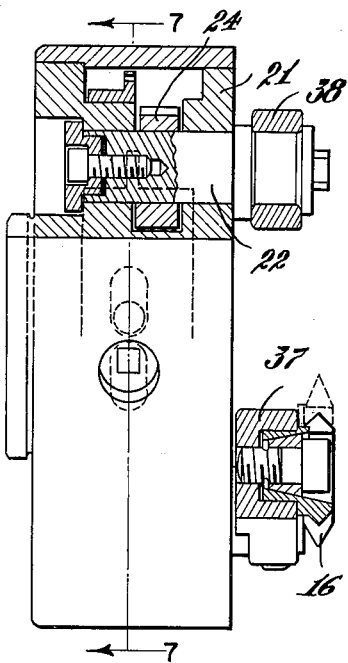
Fig. 6 is a section on line 6—6 of Fig. 5.
Figure 7:
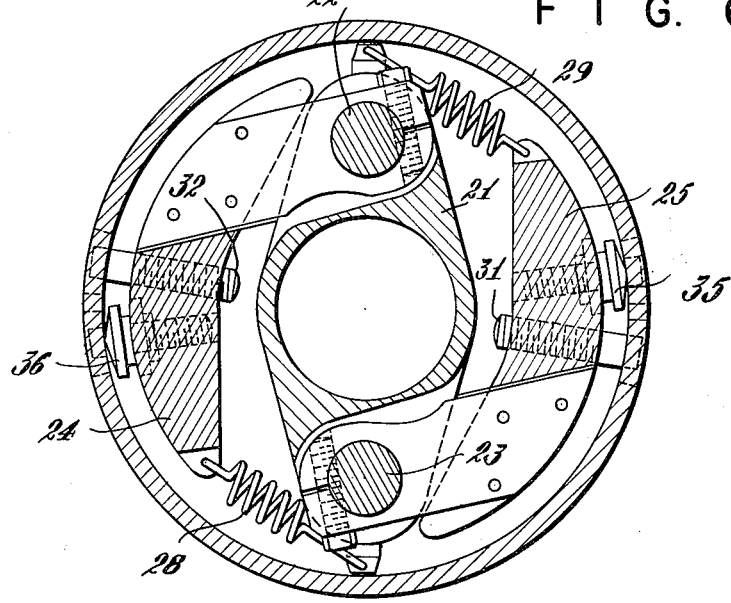
Fig. 7 is a section on line 7—7 of Fig. 6.

The shafts 22, 23 extend through the housing 21 and carry outside of the housing the cutter holders 37, 38. Annular cutters 16 (compare Fig. 4) are held in cylindrical recesses of the cutter holders as shown in Fig. 6. The cutter holders 38, 39 are frictionally fastened to the shafts 22, 23. This makes it possible to adjust the cutting edges to assume any desired diameter $D_F$ within a predetermined range.

When the machine is at rest, the two levers 24, 25 are urged by the springs 28, 29 into the inner position determined by stops 31, 32. The cutter holders 38, 39 have then moved in opposite directions, opening the cutting edges. In this position the cutter head 4 can be drawn over the finished thread portion. With the machine running, the levers 24, 25 are urged outwardly and hence the cutter holders 37, 38 inwardly, so that the cutting edges close, establishing the predetermined diameter $D_F$. The cutters are arranged in such a manner that the cutting pressure supports the cutting movement.

When the machine is put to rest after the cut has been performed, the levers 24, 25 again open the cutter holders and the mechanism carried by the head 4 can be moved over the thread that has been cut.

I claim:

1. A thread peeling machine for making outside threads, comprising: a cutter head that surrounds the workpiece and whose axis is eccentric relatively to the workpiece axis; cutting means arranged in a transverse plane and having edge front means whose flying circle diameter is smaller than the outside diameter of the thread that is to be cut; and means for increasing said flying circle diameter for the return movement.

2. The method of cutting outside surfaces such as threads with cutting means surrounding the work-piece and having an axis eccentric relatively to the work-piece axis, characterized by arranging the edge front means of the cutting means to define, in a plane transverse to said axis, a flying circle whose diameter is smaller than the outside diameter of the surface to be cut, whereby a sickle-shaped chip of optimal area can be separated from the work-piece.

3. The method according to claim 2, further characterized by increasing said flying circle diameter upon completing an axial cutting movement, whereby the cutting means can be returned to initial position ready for again decreasing the flying circle diameter and for performing the next cutting cycle.

References Cited in the file of this patent
UNITED STATES PATENTS

| | | |
|---|---|---|
| 2,749,808 | Burgsmuller | June 12, 1956 |
| 2,814,236 | Burgsmuller | Nov. 26, 1957 |
| 2,837,975 | Johnson | June 10, 1958 |